United States Patent [19]
Charkey et al.

[11] Patent Number: 5,862,392
[45] Date of Patent: *Jan. 19, 1999

[54] BATTERY INCORPORATED INTO COMPUTER CARRYING CASE

[75] Inventors: Allen Charkey, Brookfield; Dwaine K. Coates, Danbury, both of Conn.

[73] Assignee: Energy Research Corporation, Danbury, Conn.

[*] Notice: This patent issued on a continued prosecution application filed under 37 CFR 1.53(d), and is subject to the twenty year patent term provisions of 35 U.S.C. 154(a)(2).

[21] Appl. No.: 722,605

[22] Filed: Sep. 27, 1996

[51] Int. Cl.⁶ ...................................................... G06F 1/26
[52] U.S. Cl. ............................... 395/750.01; 395/750.08; 364/708.1
[58] Field of Search ......................... 395/750.08, 750.01; 320/2, 6; 364/708.1; 429/98, 162, 163, 61, 176, 96, 8, 48; 361/434, 794

[56] References Cited

U.S. PATENT DOCUMENTS

| | | | |
|---|---|---|---|
| 5,039,928 | 8/1991 | Nishi et al. | 320/2 |
| 5,475,626 | 12/1995 | Viletto | 364/708.1 |
| 5,553,294 | 9/1996 | Nanno et al. | 395/750.08 |
| 5,563,493 | 10/1996 | Matsuda et al. | 320/6 |
| 5,630,155 | 5/1997 | Karaki et al. | 395/750.08 |
| 5,631,101 | 5/1997 | Amero, Jr. | 429/90 |

*Primary Examiner*—Glenn A. Auve
*Attorney, Agent, or Firm*—Robin, Blecker & Daley

[57] ABSTRACT

A computer carrying case having a battery assembly integrated into a panel of the case. The battery assembly forms a structural component for the panel of the case into which it is integrated. In one form, the assembly is made of first and second nickel zinc battery modules. These modules are integrated into the top and bottom panels, respectively, of the case. Each module is of molded plastic form and includes a number of planar batteries each having insoluble roll bonded nickel electrodes.

21 Claims, 1 Drawing Sheet

BATTERY INCORPORATED INTO COMPUTER CARRYING CASE

BACKGROUND OF THE INVENTION

This invention relates to a battery and, in particular, to a battery for supplying power to a mobile or laptop computer.

The mobile or laptop computer market has two major trends. One trend is towards smaller, lighter computers, such as palmtop computers, and the other is towards more powerful integrated functional systems, incorporating peripheral devices such as CD-ROM drives, cellular FAX/modems and color printers. These two trends are divergent with respect to system requirements and serve two specialized markets. Highly functional integrated systems serve a unique segment of the business market that actually rely on mobile computing, the "mobile office" concept.

The typical laptop computer has an operating time of two hours or less with currently available batteries which are housed in the computer. This brief run time greatly limits the usefulness of the device, and in fact may defeat the purpose of having a laptop.

A possible solution to the short operating run time, which becomes even shorter with the addition of peripheral devices, is to increase the energy storage capacity of the battery. This necessitates making the battery larger, thereby increasing the physical size and weight of the computer and is not an acceptable approach. Another approach is to carry along extra batteries. This approach is extremely inconvenient.

It is, therefore, an object of the present invention to provide a battery for a mobile computer which can be of higher power, but which does not necessitate increasing the size of the computer.

SUMMARY OF THE INVENTION

In accordance with the principles of the present invention, the above and other objectives are realized in a battery assembly formed as an integrated part of one or more of the top, bottom and side panels of a carrying case for a mobile computer. In the embodiment of the invention to be disclosed hereinbelow, the battery assembly includes first and second nickel-zinc battery modules integrated into the top and bottom panels, respectively, of the case. Each battery module is of molded plastic form and includes a number of planar batteries each having insoluble roll bonded nickel electrodes.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
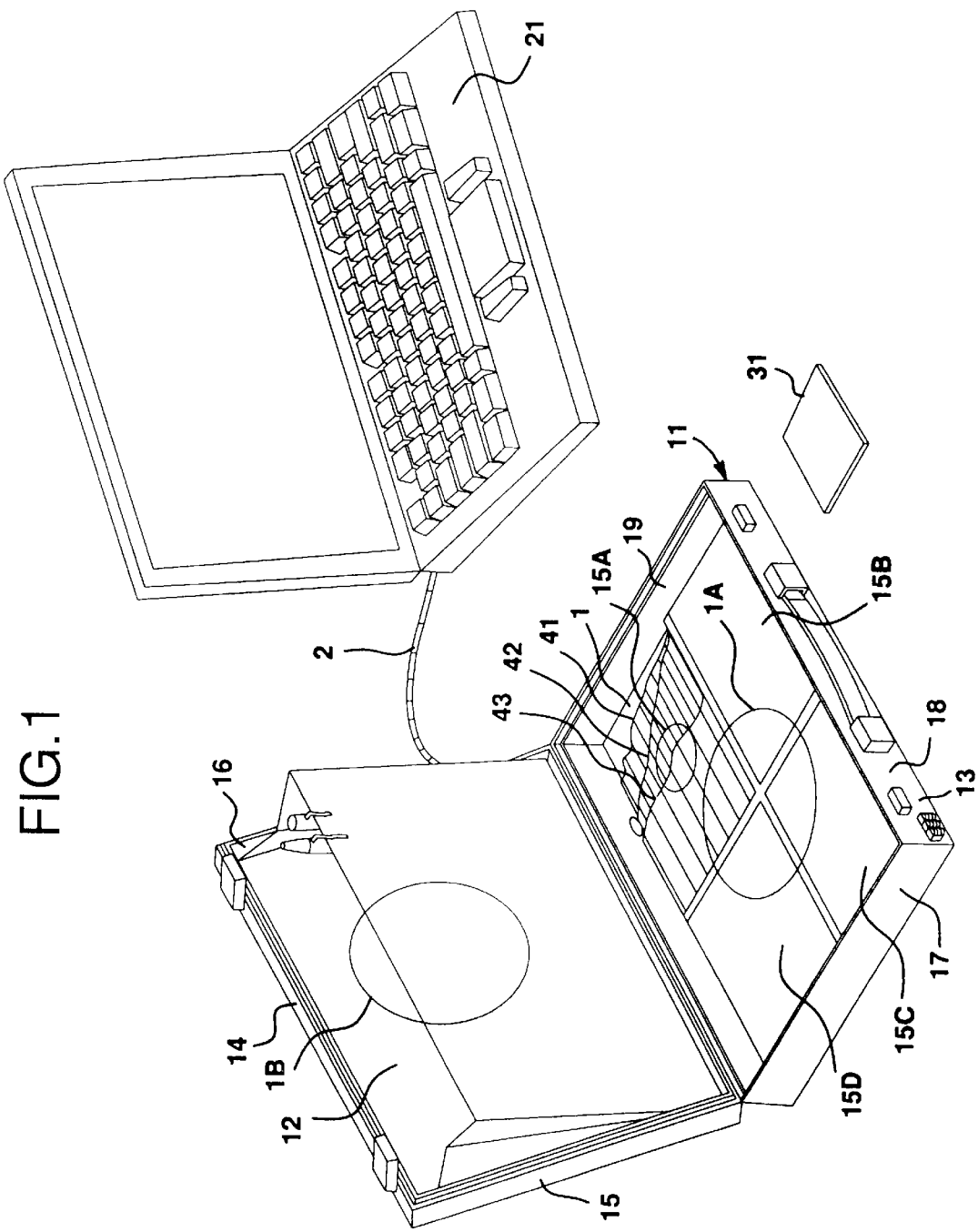
FIG. 1 shows diagrammatically a battery assembly incorporated into a mobile computer carrying case in accordance with the principles of the present invention.

FIG. 1 shows diagrammatically a battery assembly 1 incorporated into a mobile or laptop computer carrying case 11, in accordance with the principles of the present invention. As shown, the battery assembly 1 includes two battery modules 1A and 1B formed as integral parts of the top and bottom panels 12 and 13 of the case 11. The case 11 further includes lightweight side panels 14–19 which can comprise plastic or metal and which complete the case 11.

A battery cable 2 permits the output of the battery modules 1A and 1B to deliver power to a computer 21 to be carried in the case 11. Since the battery modules 1A and 1B are integrated with the top and bottom panels of the case, the computer 21 can be operated while the computer is inside or outside the case. Also, since the battery modules are not stored within the computer 21, they can be designed for significantly increased power and run times, while not requiring an increase in the size of the computer. The increased power of the battery modules also permits peripherals, such as, printers, CD-ROM drives, memory backup and fax modems to be used with the computer.

Preferably, the battery modules 1A and 1B are of light weight molded plastic form. Also, preferably, the modules comprise planar, nickel-zinc batteries, having insoluble, roll bonded composite zinc electrodes and an improved electrolyte system. With this construction, the modules are low cost, light weight and extremely flexible, permitting easy integration into the case 11.

A microprocessor based printed circuit board 31 supported adjacent to the side panel 19 of the case is used to distribute and condition battery power for a variety of uses, as well as to provide state-of-charge monitoring for the battery assembly 1. The circuit board also communicates through the cable 2 directly with the computer 21 to provide battery data to the power management software resident in the computer. A battery charging function of the circuit board 31 allows the battery modules 1A and 1B to be charged from a variety of input sources, such as, U.S. or European A.C. line power or twelve volt D.C. power from an automobile battery. The battery modules 1A and 1B may also be used to power additional devices other than computer 21 such as cellular phones or be used to recharge batteries of other devices.

FIG. 1 also shows a detailed diagram of the bottom battery module 1B of FIG. 1. As shown, the battery module includes four batteries 15A, 15B, 15C and 15D formed as a prismatic four-battery monoblock providing six volts of power. With battery module 1A similarly formed, the case 11 provides a total of twelve volts D.C. power. Each of the batteries 15A–15D is comprised of a layered structure of a positive plate 41, a separator 42 and a negative plate 43 to form a cell pack. The packs are united into the four battery monoblock of molded plastic, so as to provide the needed strength to be used as the structural components of the respective top or bottom panel of the case 11. The batteries 15A–15D of the monoblock thus have large flat surface areas which allow the batteries to be thin enough so as not to significantly increase the thickness of the case 11.

As can be appreciated, the battery modules 1A and 1B form the major structural components of the top and bottom panels 12 and 13 of the case 11, with the side panels forming the remaining framework of the case.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A carrying case comprising:

top and bottom panels;

side panels attached to said top and bottom panels;

said top and bottom panels and said side panels together forming a case which can be opened to receive an object and closed to house the received object in an enclosed space;

a battery assembly integrated into and forming a structural component of at least one of said panels for providing power.

2. The apparatus of claim 1 wherein:

said at least one panel is one of the top and bottom panels.

3. The apparatus of claim 2 further comprising:

a further battery assembly incorporated into the other of the one of the top and bottom panels.

4. The apparatus of claim 1 wherein:

said battery assembly comprises a battery module including at least one battery supported in molded plastic.

5. The apparatus of claim 4 wherein:

said at least one battery is a nickel-zinc battery.

6. The apparatus of claim 5 wherein:

said nickel-zinc battery comprises a negative zinc electrode.

7. The apparatus of claim 6 wherein:

said negative zinc electrode is insoluble and roll bonded.

8. The apparatus of claim 5 wherein:

said at least one battery includes planar positive and negative electrodes with a separator therebetween.

9. The apparatus of claim 5 wherein:

said battery assembly comprises a plurality of batteries supported in a molded plastic monoblock.

10. The apparatus of claim 9 wherein:

each of said batteries of said monoblock is a nickel-zinc battery.

11. The apparatus of claim 10 wherein:

each nickel-zinc battery comprises a negative zinc electrode.

12. The apparatus of claim 11 wherein:

each said negative zinc electrode is insoluble and roll bonded.

13. The apparatus of claim 9 wherein:

each of said batteries includes planar positive and negative electrodes with a separator therebetween.

14. The apparatus of claim 9 wherein:

said plurality of batteries provide a six volt output.

15. The apparatus of claim 1 further comprising:

a microprocessor to control power management and power distribution of said battery assembly.

16. The apparatus of claim 15 wherein:

said microprocessor communicates directly with a computer and battery management software in the computer.

17. The apparatus of claim 1 further comprising:

a battery charger to charge said battery.

18. The apparatus of claim 17 wherein:

said battery charger carries out charge monitoring of the battery.

19. The apparatus of claim 1:

wherein said case has a power output to power other devices.

20. The apparatus of claim 1 wherein:

said case has a charge output to charge other devices and batteries.

21. A carrying case in accordance with claim 1 wherein:

said case is for carrying a computer; and said battery assembly supplies power to said computer.

* * * * *